United States Patent
Simon

(10) Patent No.: US 6,199,258 B1
(45) Date of Patent: Mar. 13, 2001

(54) METHOD FOR COMPRESSING WIRE MESH GRIP TO FACILITATE INSTALLATION ON CABLES

(75) Inventor: Robert J. Simon, Huntington, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/401,884

(22) Filed: Sep. 23, 1999

Related U.S. Application Data

(62) Division of application No. 08/905,532, filed on Aug. 4, 1997.

(51) Int. Cl.[7] .................................................. B23P 11/02
(52) U.S. Cl. .................................. 29/450; 29/754; 29/235
(58) Field of Search .......................... 29/450, 235, 281.1, 29/282, 881, 754

(56) References Cited

U.S. PATENT DOCUMENTS

| | | | |
|---|---|---|---|
| 606,557 | * 6/1898 | Kelso et al. ........................... | 134/127 |
| 1,521,764 | 1/1925 | Graver ................................ | 29/283 X |
| 1,898,959 | 2/1933 | Hilliard ................................. | 29/283 |
| 3,325,885 | 6/1967 | Ziegler, Jr. .......................... | 29/280 X |
| 3,555,648 | 1/1971 | Zebb ..................................... | 29/283 |
| 5,133,583 | * 7/1992 | Wagman et al. .................. | 294/86.42 |
| 5,351,385 | * 10/1994 | Takano .................................. | 29/450 |

* cited by examiner

Primary Examiner—S. Thomas Hughes
Assistant Examiner—Jermie E. Cozart
(74) Attorney, Agent, or Firm—Jerry M. Presson; Michael R. Swartz

(57) ABSTRACT

A fixture for installing a flexible wire mesh grip over an elongated cable includes a base having spaced opposite ends and an internal cavity extending longitudinally therebetween. The spaced opposite ends define respective first and second passages opening into the internal cavity. The internal cavity has a cross-sectional size larger than that of a tubular body of the grip in a compressed non-gripping condition to accommodate the presence of the tubular body in the compressed non-gripping condition and of an annular collar secured on one end thereof within the internal cavity. The internal cavity and first and second passages of the base have respective cross-sectional sizes larger than that of the cable to permit insertion of the cable therethrough. The cross-sectional size of at least one of the first and second passages of the base is smaller than that of the internal cavity and of the annular collar and the tubular body in the compressed non-gripping condition so as to define an interior shoulder on the base that at least partially surrounds the one passage and against which the annular collar secured on the one opposite end of the tubular body can be placed to facilitate moving the other opposite end of the tubular body toward the annular collar and one opposite end to convert the tubular body from an expanded gripping condition to the compressed non-gripping condition with respect to the cable and thereby facilitate movement of the cable through the passageway of the tubular body and thus relative to the grip.

3 Claims, 3 Drawing Sheets

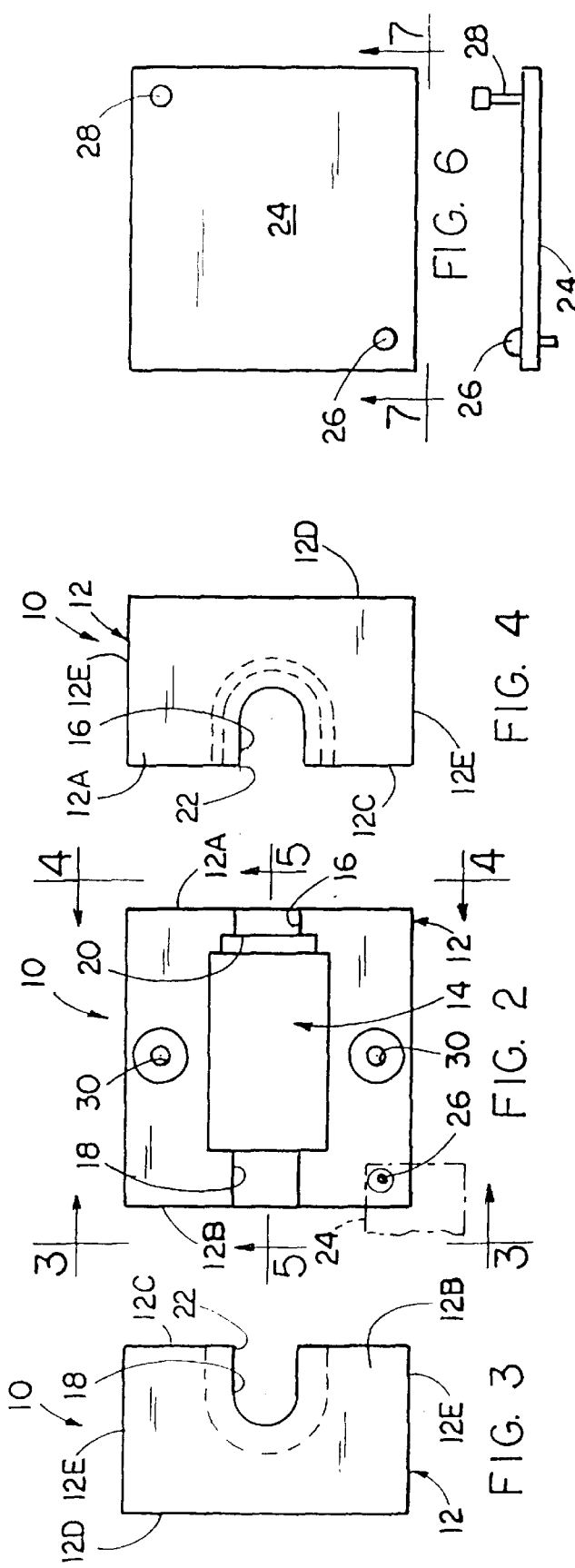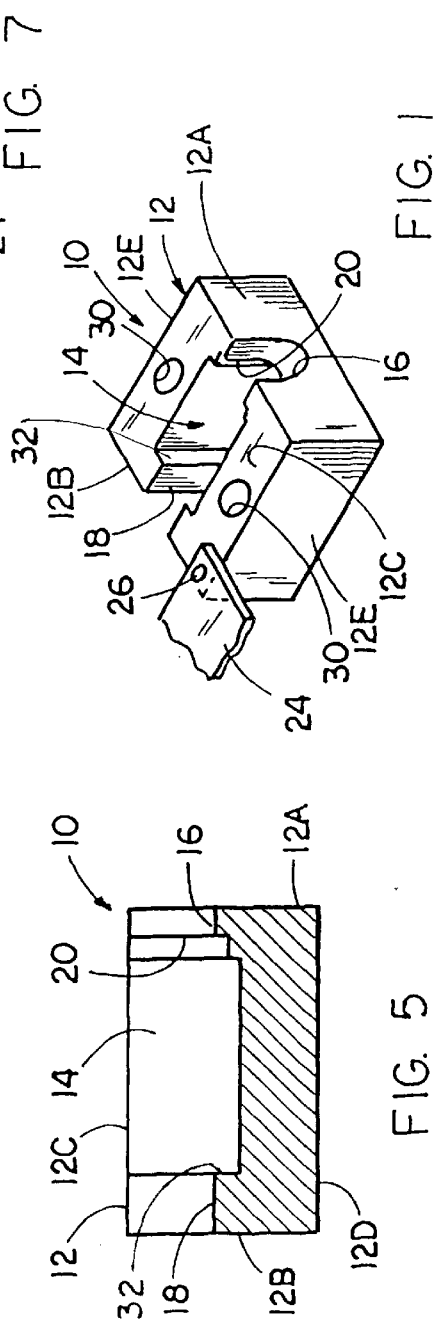

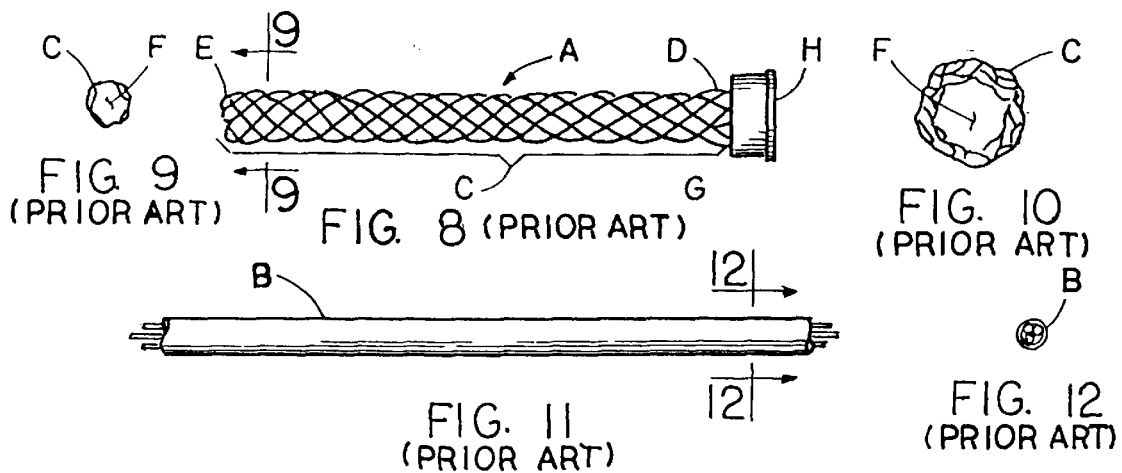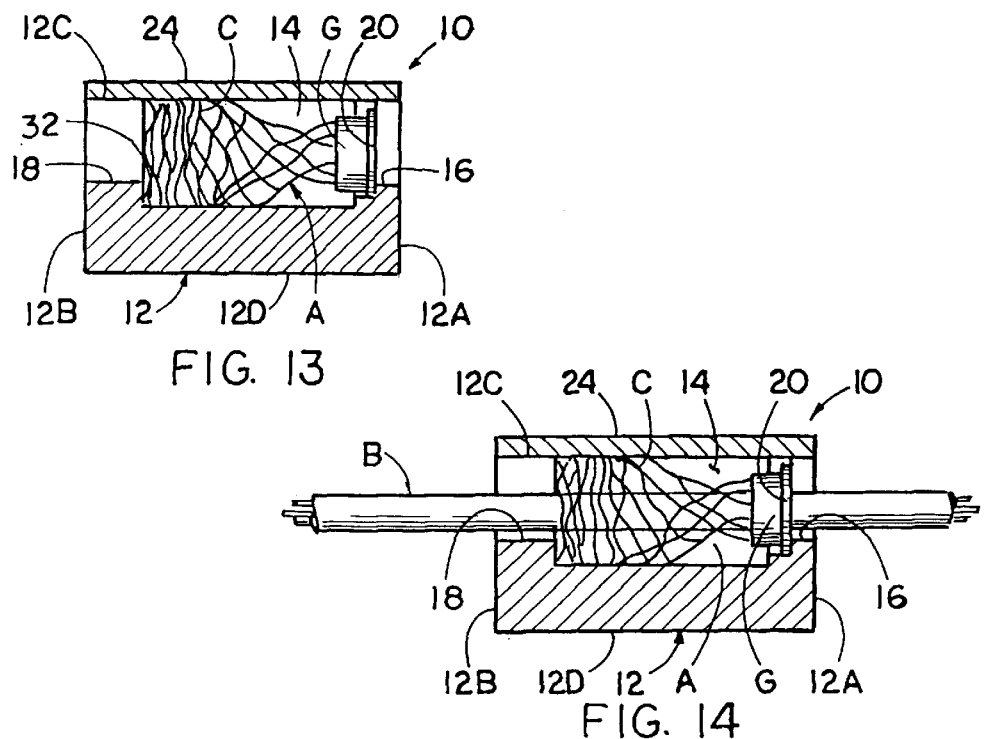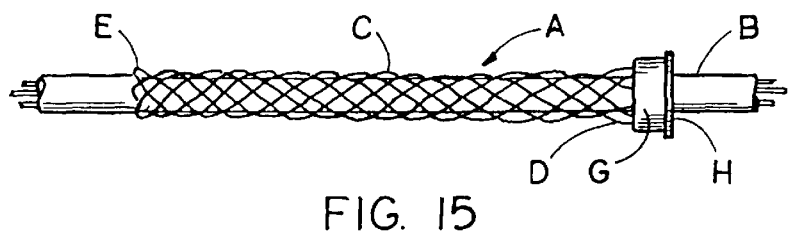

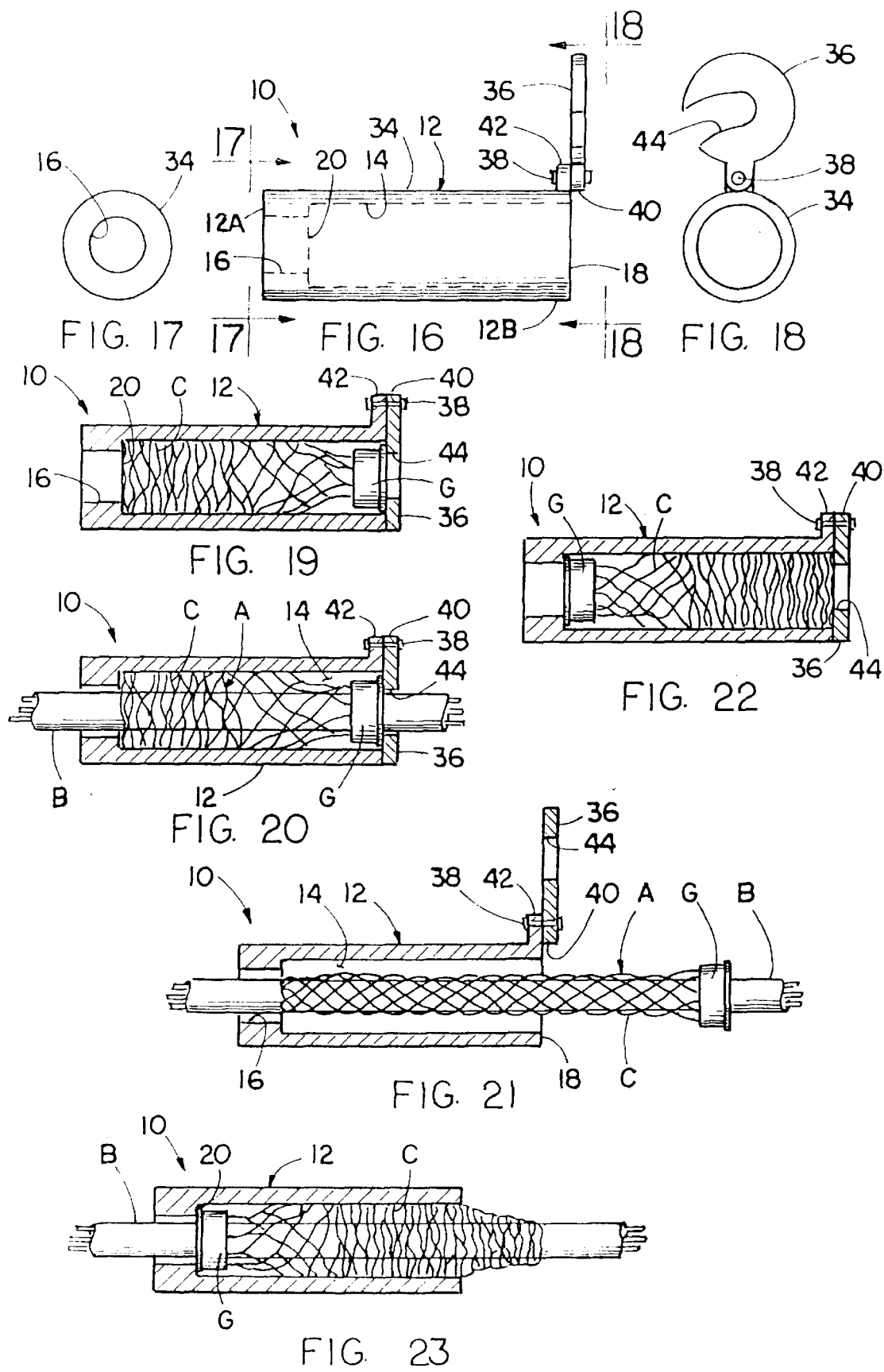

METHOD FOR COMPRESSING WIRE MESH GRIP TO FACILITATE INSTALLATION ON CABLES

This is a division of copending application Ser. No. 08/905,532, filed Aug. 4, 1997.

BACKGROUND OF THE INVENTION

1. Field of the Invention

The present invention generally relates to wire mesh grips for strain relief protection of flexible cables, and more particularly, is concerned with a fixture and method for compressing a wire mesh grip to facilitate installation of a flexible cable therethrough.

2. Description of the Prior Art

Heretofore, wire mesh grips that provide solutions for cable management problems, such as strain relief protection and support of flexible cables (the term "cable" is used in a generic sense to also include conduits, cords, hoses and the like), have been manufactured and marketed by Hubbell Incorporated of Orange, Conn., the assignee of the subject application. Like a woven bamboo finger-trap toy, the wire mesh grip is deceptively simple in design. Nonetheless, the wire mesh grip is extremely effective for supporting and pulling a flexible cable in manner which avoids, or at least minimizes, damage thereto, such as would occur with pulling a cable out from a connection, and thereby extends the life of the cable. Wire mesh grips are widely used in diverse industrial and commercial applications wherever cables go in, out, through and around a wide variety of equipment.

Because of its tubular shape and endless weave construction, the wire mesh grip concurrently increases in axial length and decreases in diameter as it is moved in the axial direction from a compressed condition to an expanded condition. With the wire mesh grip normally disposed in its expanded condition surrounding and gripping a cable, the application of a pulling force on the cable that will tend to pull the cable away from its connection to the equipment will also pull on and tend to further expand the wire mesh grip in the axial direction away from a fixed anchor location. Such expansion of the wire mesh grip will further decrease its diameter and thereby increase its grip on the cable so as to resist the pull on the cable and prevent damage to its connection with the equipment.

To install the wire mesh grip about a cable, the diameter of the wire mesh grip first must be increased to a size greater than that of the cable so as to allow insertion of the cable through the grip. The diameter of the wire mesh grip is increased by decreasing its axial length which, in turn, is brought about by compressing the opposite ends of the wire mesh grip in the axial direction toward one another. Up to the present time, such compressing of the wire mesh grip has been carried out manually by a worker. To compress the grip, the worker has had to push the opposite ends of the grip toward one another against the grip's natural tendency to spring back and expand or elongate to a given greater length and to a diameter smaller than the cable to which it is designed to be applied. It is difficult and tiresome for a worker to so compress the grip and then to hold it in the compressed non-gripping condition as a cable is inserted through it. In some instances, it takes two workers to hold the grip in the compressed non-gripping condition and install the cable through the compressed grip.

Consequently, a need still exists for improvements in the ability of workers to handle wire mesh grips so as to thereby improve the productivity of workers in installing wire mesh grips over cables.

SUMMARY OF THE INVENTION

The present invention provides a wire mesh grip installation fixture and method designed to satisfy the aforementioned needs. The fixture and method of the present invention provides a means and technique for effortless and prolonged retention of a wire mesh grip in a compressed non-gripping condition so as to facilitate the installation of the compressed grip over a cable and the relocational movement of the grip relative to the cable.

Accordingly, the present invention is directed to a fixture for installing a flexible wire mesh grip over an elongated cable. The flexible wire mesh grip is per se of a conventional type which includes an elongated tubular body terminating in a pair of opposite open ends and defining an elongated passageway extending between the opposite open ends through which to receive the cable and an annular collar secured to one of the opposite open ends of the tubular body. The tubular body has a multi-stranded interwoven construction permitting the tubular body to retract and extend in length and correspondingly enlarge and contract in circumference and thereby respectively increase and decrease in diameter by moving the opposite ends of the tubular body toward and away from one another and thereby convert the tubular body between an expanded gripping condition and compressed non-gripping condition with respect to the cable.

The installing fixture of the present invention comprises a base having a pair of spaced opposite end portions and an internal cavity extending longitudinally therebetween. The spaced opposite end portions define respective first and second passages opening into the internal cavity. The internal cavity has a cross-sectional size larger than that of the annular collar and the tubular body of the grip in the compressed non-gripping condition to accommodate the presence of the annular collar and the tubular body within the internal cavity in the compressed non-gripping condition. Also, the internal cavity and first and second passages have respective cross-sectional sizes larger than that of the cable to permit insertion of the cable through the internal cavity and first and second passages. In addition, the cross-sectional size of at least one of the first and second passages is smaller than that of the internal cavity and of the annular collar and the tubular body in the compressed non-gripping condition so as to define an interior shoulder on the base that at least partially surrounds the one passage and against which the annular collar secured on the one opposite end of the tubular body can be placed to facilitate moving of the other opposite open end of the tubular body toward the annular collar and one open end thereof to convert the tubular body from the expanded gripping condition to the compressed non-gripping condition and thereby facilitate movement of the cable through the passageway of the tubular body and thus relative to the grip.

More particularly, in a first embodiment, the base is generally rectangular and, in addition to the pair of spaced opposite end portions, includes spaced opposite top and bottom portions and a pair of spaced opposite side portions. The spaced opposite end portions extend between the top and bottom portions and opposite side portions and respectively defining the first and second passages to the internal cavity. Also, the top portion defines a top opening in the base which leads into the internal cavity. Additionally, in the first embodiment the fixture further comprises a cover pivotally mounted to the base to undergo movement between adjacent and remote positions relative to the top opening therein so as to respectively close and open the top opening to the internal cavity. Further, the cross-sectional size of the other of the first and second passages of the base can be larger than that of the tubular body in the expanded gripping condition and smaller than that of the tubular body in the compressed non-gripping condition and of the internal cavity of the base so as to define an opposite interior shoulder on the base that at least partially surrounds the other of the first and second passages to permit insertion of the tubular body in the expanded gripping condition through the other of the first and second passages while preventing removal of the tubular body in the compressed non-gripping condition through the other of the first and second passages.

In a second embodiment, the base is a continuous annular side wall defining the internal cavity. The continuous side wall has the opposite end portions of the base respectively defining the first and second passages to the internal cavity. Also, in the second embodiment the cover is pivotally mounted to the other of the opposite end portions of the annular side wall of the base to undergo movement between adjacent and remote positions relative to the other of the first and second passages defined by the other of the opposite end portions. The cover defines an opening having a cross-section size larger than that of the cable and smaller than that of the annular collar and the tubular body in the compressed non-gripping condition to permit insertion of the cable through the opening in the cover while preventing removal of the annular collar and tubular body in the compressed non-gripping condition through the opening in the cover. The opening of the cover preferably is a slot extending from a circumferential edge portion of the cover to proximate a center of the cover so that the cover can be pivoted to the adjacent position relative to the other of the first and second passages while the cable extends through the internal cavity of the base and through the tubular body of the grip. The internal shoulder is defined by the other end portion of the annular side wall about the other of the first and second passages.

The present invention is also directed to a method for installing a flexible wire mesh grip over an elongated cable. The installing method comprises the steps of: (a) providing the above-defined fixture; (b) placing the annular collar in the internal cavity of the base against the interior shoulder on the base; (c) compressing the tubular body to move the other of the opposite ends of the tubular body toward the annular collar and one opposite end thereof to convert the tubular body from the expanded gripping condition to the compressed non-gripping condition; and (d) holding the annular collar with the tubular body in the compressed non-gripping condition within the internal cavity of the base to thereby facilitate movement of the cable through the first and second passages and internal cavity of the base and through the annular collar and the tubular body in the compressed non-gripping condition and thus relative to the grip to place the grip at a desired location on the cable.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a perspective view of a first embodiment of a wire mesh grip installation fixture of the present invention.

FIG. 2 is an enlarged top plan view of a base of the fixture of FIG. 1.

FIG. 3 is one end elevational view of the fixture base as seen along line 3—3 of FIG. 2.

FIG. 4 is an opposite end elevational view of the fixture base as seen along line 4—4 of FIG. 2.

FIG. 5 is a longitudinal cross-sectional view of the fixture base taken along line 5—5 of FIG. 2.

FIG. 6 is an enlarged top plan view of a cover of the fixture of FIG. 1.

FIG. 7 is a side elevational view of the fixture cover as seen along line 7—7 of FIG. 6.

FIG. 8 is a side elevational view of a prior art wire mesh grip before its installation over a prior art cable.

FIG. 9 is a cross-sectional view of the prior art wire mesh grip taken along line 9—9 of FIG. 8 showing the grip in an expanded gripping condition.

FIG. 10 is another cross-sectional view of the prior art wire mesh grip similar to that of FIG. 9 but showing the grip in a compressed non-gripping condition.

FIG. 11 is a fragmentary side elevational view of the prior art cable over which the prior art wire mesh grip is to be installed.

FIG. 12 is a cross-sectional view of the prior art cable taken along line 12—12 of FIG. 11.

FIG. 13 is a longitudinal cross-sectional view of the first embodiment of the fixture of the present invention showing the prior art wire mesh grip in a compressed non-gripping condition disposed in a cavity in the base of the fixture before the cable has been inserted through the compressed wire mesh grip.

FIG. 14 is a longitudinal cross-sectional view of the first embodiment of the fixture similar to that of FIG. 13 but after the cable has been inserted through the wire mesh grip.

FIG. 15 is a side elevational view of the prior art wire mesh grip after its installation over the cable.

FIG. 16 is a side elevational view of a second embodiment of a wire mesh grip installation fixture of the present invention.

FIG. 17 is one end elevational view of the fixture as seen along line 17—17 of FIG. 16.

FIG. 18 is an opposite end elevational view of the fixture as seen along line 18—18 of FIG. 16.

FIG. 19 is a longitudinal cross-sectional view of the second embodiment of the fixture of the present invention showing the prior art wire mesh grip in a compressed non-gripping condition disposed in a cavity in the fixture before the cable has been inserted through the compressed wire mesh grip.

FIG. 20 is a longitudinal cross-sectional view of the second embodiment of the fixture similar to that of FIG. 19 but after the cable has been inserted through the compressed wire mesh grip.

FIG. 21 is a longitudinal cross-sectional view of the second embodiment of the fixture similar to that of FIG. 20 but after the wire mesh grip has expanded lengthwise to its natural expanded gripping condition.

FIG. 22 is a longitudinal cross-sectional view of the second embodiment of the fixture of the present invention similar to that of FIG. 19 but showing the prior art wire mesh grip in a compressed non-gripping condition disposed in a cavity in the fixture in an orientation which is the reverse of that shown in FIG. 19.

FIG. 23 is a longitudinal cross-sectional view of a modified form of the second embodiment of the fixture of the present invention which can be used to compress the grip and move the compressed grip along the cable from one location to another.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1 and 16, there is illustrated a fixture of the present invention, generally designated 10, for installing a prior art flexible wire mesh grip A, as seen in FIGS. 8–10, over a prior art elongated cable B, as seen in FIG. 11. The flexible wire mesh grip A is a conventional type having an elongated tubular body C terminating in a pair of opposite open ends D, E and defining an elongated passageway F extending between the opposite open ends D, E through which to receive the cable B. Preferably, one of the opposite open ends D of the tubular body C has an annular shaped attachment or connection collar G secured thereto. The tubular body C has a multi-stranded interwoven construction permitting the tubular body C to retract and extend in length and to correspondingly enlarge and contract in circumference and thereby respectively increase and decrease in diameter by moving the opposite ends D, E of the tubular body C toward and away from one another and thereby convert the tubular body C between an expanded gripping condition with respect to the cable B, as shown in FIGS. 8, 9, 15 and 21, and compressed non-gripping condition with respect to the cable B, as shown in FIGS. 10, 13, 14, 19 and 20. As is readily apparent, the tubular body C in the compressed non-gripping condition has a circumference and diameter greater in size than in the expanded gripping condition. Furthermore, the collar G has a diameter size that is larger than the tubular body C of the grip A in the expanded gripping condition. The collar G also presents a relatively flat annular shaped front surface H on the side thereof opposite from the tubular body C of the grip A.

Therefore, because of its tubular shape and endless weave construction, the tubular body C of the wire mesh grip A can be concurrently increased in axial length and decreased in diameter or vice versa as it is correspondingly moved in an axial direction between its expanded gripping and compressed non-gripping conditions. With the wire mesh grip normally disposed in its expanded gripping condition wherein it will surround and grip the cable B, the application of a pulling force on the cable B that will tend to pull the cable away from its connection to the equipment will also pull on and tend to further expand or lengthen the wire mesh grip A in the axial direction away from a fixed anchor location. Such expansion of the wire mesh grip A will further decrease its diameter and thereby increase its grip on the cable B so as to resist the pull on the cable and prevent damage to its connection with the equipment.

To apply the wire mesh grip A about the cable B, the diameter of the grip A first must be increased to a size greater than that of the cable B so as to allow insertion of the cable B through the passageway F of the grip A. As explained above, the diameter of the wire mesh grip A is increased by decreasing its axial length which, in turn, is brought about by compressing the opposite open ends D, E of the grip A in the axial direction toward one another.

In accordance with the present invention, the installing fixture 10 is provided in two basic embodiments. The first embodiment of the fixture 10 shown in FIGS. 1–7, 13 and 14 preferably is employed as a bench-mounted unit, whereas the second embodiment shown in FIGS. 16–21 is employed as a portable handheld unit. A modified form of the second embodiment of the fixture 10 shown in FIG. 23 is employed primarily to compress the grip A and then move it along the cable B from one location to another.

Referring to FIGS. 1–7 and 16–18, each of the first and second embodiments of the fixture 10 basically includes a base 12 having a pair of spaced opposite end portions 12A, 12B and an internal cavity 14 formed in the base 12 and extending longitudinally between the opposite end portions 12A, 12B. The spaced opposite end portions 12A, 12B of the base 12 define respective first and second passages 16, 18 which open into the internal cavity 14. As is apparent in FIGS. 13, 14, 19 and 20, the internal cavity 14 in the base 12 has a cross-sectional size larger than that of the grip's annular collar G and tubular body C in the compressed non-gripping condition which enables the base 12 to accommodate the presence of the annular collar G and tubular body C within the internal cavity 14. Also, as is apparent in FIGS. 14 and 20, the internal cavity 14 and first and second passages 16, 18 of the base 12 have respective cross-sectional sizes larger than that of the cable B which enables the cable B to be inserted by a user through the internal cavity 14 and the first and second passages 16, 18. In addition, as is apparent in FIGS. 14 and 20, the cross-sectional size of at least the first passage 16 is smaller than that of the internal cavity 14 and of the annular collar G and the tubular body C in the compressed non-gripping condition so as to define an interior shoulder 20 on the one end portion 12A of the base 12 that at least partially surrounds the first passage 16 therethrough. The interior shoulder 20 provides a stationary surface on the base 12 against which the annular collar G of the grip A, being secured on the one open end D of the tubular body C thereof, can be placed to facilitate compressing of the tubular body C by moving of the other open end E of the tubular body C toward the annular collar G and one open end D of the grip A so as to convert the tubular body C from the expanded gripping condition, as seen in FIG. 8 (and FIGS. 15 and 21) to the compressed non-gripping condition, as seen in FIGS. 13, 14, 19 and 20, and thereby facilitate the user's ability to readily move the cable B through the passageway F of the tubular body C relative to the grip A, as depicted particularly in FIGS. 14 and 20.

More particular, referring to FIGS. 1–7, 13 and 14, in the first embodiment of the fixture 10, the base 12 and internal cavity 14 generally, although not necessarily, are rectangular in shape. In addition to the pair of spaced opposite end portions 12A, 12B, the base 12 includes spaced opposite top and bottom portions 12C, 12D and a pair of spaced opposite side portions 12E rigidly connected to the top and bottom portions 12C, 12D. The spaced opposite end portions 12A, 12B extend between and are rigidly connected to the top and bottom portions 12C, 12D and the opposite side portions 12E and together therewith define the internal cavity 14. Also, the top portion 12C defines a top opening 22 in the base 12 which leads into the internal cavity 14.

Additionally, in the first embodiment the fixture 10 includes a cover 24, generally rectangular in shape, which is pivotally mounted by pivot pin 26 to one corner of the base 12 and can be releasably connected by slidable lock pin 28 to an opposite corner thereof. When the lock pin 28 is lowered it engages with the base 12 so as to prevent the cover 24 from being moved, whereas when the lock pin 28 is raised from the base 12 it unlocks the cover 24 so that a user can pivotally move the cover 24 between an adjacent position shown in FIGS. 13 and 14 wherein the cover 24 overlies and closes the top opening 22 to the internal cavity 14 and a displaced or remote position shown in FIGS. 1 and 2 wherein the cover 24 is displaced from and opens the top opening 22 to the internal cavity 14. A pair of bores 30 are provided through the opposite side portions 12E of the base 12 between the top and bottom portions 12C, 12D thereof for receiving suitable fasteners (not shown) for stationarily mounting the base 12 to a work bench or the like.

Further, as is apparent in FIGS. 13 and 14, the other or second passage 18 through the other end portion 12B of the base 12 preferably has a cross-sectional size that is larger than that of the tubular body C in the expanded gripping condition but smaller than that of the tubular body C in the compressed non-gripping condition. The second passage 18 is also smaller in cross-sectional size than the internal cavity 14 so as to define an apposite interior shoulder 32 on the base 12 that at least partially surrounds the second passage 18 to permit insertion of the tubular body C in the expanded gripping condition through the second passage 18 into the internal cavity 14, if desired, while preventing removal of the tubular body C in the compressed non-gripping condition from the internal cavity 14 through the second passage 18.

Referring now to FIGS. 16–21, in the second embodiment of the fixture 10, the base 12 is in the form of a continuous annular side wall 34 defining the internal cavity 14 and having a substantially cylindrical shape. The continuous side wall 34 has the opposite end portions 12A, 12B of the base 12 respectively defining the first and second passages 16, 18 to the internal cavity 14. Additionally, in the second embodiment, the fixture 10 includes a cover 36 which is substantially circular in shape and pivotally mounted by a pivot pin 38 extending through a tab 40 rigidly connected to and projecting outwardly from the cover 36 and through another tab 42 rigidly connected to and projecting outwardly from the one end portion 12A of the annular side wall 34. In such mounting arrangement, the cover 36 is adapted to be pivotally moved by a user between an adjacent position shown in FIGS. 19 and 20 wherein the cover 36 overlies and closes the second passage 18 to the internal cavity 14 through the other end portion 12B of the annular side wall 34 and a displaced or remote position shown in FIGS. 16 and 21 wherein the cover 36 is displaced from and opens the second passage 18 to the internal cavity 14. Further, the cover defines an opening 44 in the form of a slot therethrough which has a cross-section size larger than that of the cable B and smaller than that of the annular collar G and the tubular body C in the compressed non-gripping condition. Thus, the size of the opening 44 permits the insertion of the cable B through the opening 44 in the cover 36 into the internal cavity 14 while still preventing removal of the annular collar G and the tubular body C in the compressed non-gripping condition from the internal cavity 14 through the opening 44 in the cover 36. As seen in FIG. 18, the opening or slot 44 extends from a circumferential edge portion of the cover 36 to proximate a center of the cover 36 so that the cover can be pivoted to the adjacent position relative to the second passage 18 while the cable B extends through the first and second passages 16,18 and the internal cavity 14 of the base 12 and through the tubular body C of the grip A. The tubular body C can be held in the internal cavity 14 in either of the orientations shown in FIGS. 19, 20 and FIG. 22. The modification to the second embodiment of the fixture 10 shown in FIG. 23 is the omission of the cover 36. In this instance, the fixture 10 is just used for engaging the annular collar G of the grip A to compress the tubular body C sufficiently to release its grip on the cable B so that the grip can be easily relocated along the cable B.

The present invention is also directed to a method for installing the flexible wire mesh grip A over the elongated cable B using either one of the two embodiments of the fixture 10 of FIGS. 1 and 16. After being provided with the above-described installing fixture 10, the method steps performed by a user to install the grip A over the cable B basically include, first, placing the annular collar G on the one end D of the tubular body C of the grip A into the internal cavity 14 of the base 12 against the interior shoulder 20 on the base 12 and, second, compressing the tubular body C by forcibly moving the other opposite end E of the tubular body C toward the annular collar G and one opposite end D to increase the diameter and decrease the length of the grip A and thereby convert its tubular body C from the expanded gripping condition to the compressed non-gripping condition. Then, the other end E of the tubular body C, in the compressed non-gripping condition and reduced length, is disposed and held within the cavity 14 along with the annular collar G to thereby facilitate insertion of the cable B through the first and second passages 16, 18 and internal cavity 14 of the base 12 and through the annular collar G and compressed tubular body C and thus relative to the grip A to place the grip A at a desired location on the cable B. In the case of the first embodiment of the fixture 10, the cover 24 is closed to retain the compressed grip A with the internal cavity 14 and prevent its accidental ejection therefrom. In the case of the second embodiment of the fixture 10, the cover 36 is closed to retain the compressed grip A within the internal cavity 14 until release and expansion of the grip A back to its original length along the cable B is desired. When the cover 36 is swung open to the displaced position shown in FIG. 21, the tubular body C of the grip A will automatically expand through the second passage 18 of the base 12 to the normal length of the grip A in which it assumes the expanded gripping condition relative to the cable.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

What is claimed is:

1. A method for installing a flexible wire mesh grip over an elongated cable wherein the grip has an elongated tubular body terminating in a first open end and a second open end opposite to the first open end and defining an elongated passageway extending between the first and second open ends through which to receive the cable and an annular collar secured to one of the first and second opposite open ends of the tubular body, the tubular body having a multi-stranded interwoven construction permitting the tubular body to retract and extend in length and to correspondingly enlarge and contract in circumference and thereby respectively increase and decrease in diameter by moving the first and second opposite ends of the tubular body toward and away from one another and thereby convert the tubular body between an expanded gripping condition and compressed non-gripping condition with respect to the cable, said installing method comprising the steps of:

(a) providing a base having a pair of spaced opposite ends and an internal cavity extending longitudinally therebetween with the spaced opposite ends defining respective first and second passages opening into the internal cavity, the internal cavity having a cross-sectional size larger than that of the annular collar and the tubular body in the compressed non-gripping condition to accommodate the presence of the annular collar and the tubular body in the compressed non-gripping condition in the internal cavity, the internal cavity and first and second passages having respective cross-sectional sizes larger than that of the cable to permit insertion of the cable therethrough, the cross-sectional size of at least one of the first and second passages being smaller than that of the internal cavity and the annular collar and the tubular body in the compressed non-gripping condition so as to define an interior shoulder on the base that at least partially surrounds the one of the first and second passages;

(b) placing the annular collar in the internal cavity of the base against the interior shoulder on the base; and (c) compressing the tubular body to move one of the first and second opposite ends of the tubular body toward the annular collar and the other one of the first and second opposite ends of the tubular body, to convert the tubular body from the expanded gripping condition to the compressed non-gripping condition; and (d) holding the annular collar with the tubular body in the compressed non-gripping condition within the internal cavity of the base to thereby facilitate movement of the cable through the first and second passages and internal cavity of the base and through the annular collar and the tubular body in the compressed non-gripping condition and thus relative to the grip to place the grip at a desired location on the cable.

2. The method as recited in claim 1, further comprising:

moving a cover to a closed position relative and adjacent to a top opening in the base leading to the internal cavity to retain the annular collar and tubular body in the compressed non-gripping condition therein.

3. The method as recited in claim 1, further comprising:

moving a cover to a closed position relative and adjacent to an end passage in the base leading to the internal cavity to retain the annular collar and tubular body in the compressed non-gripping condition therein.

* * * * *